US011958653B1

(12) United States Patent
Simiriglio

(10) Patent No.: US 11,958,653 B1
(45) Date of Patent: Apr. 16, 2024

(54) PEEL-OFF LABEL DISPENSER, SYSTEM AND METHOD

(71) Applicant: Simco NJ, Inc., Vineland, NJ (US)

(72) Inventor: Gaetan Simiriglio, Sewell, NJ (US)

( * ) Notice: Subject to any disclaimer, the term of this patent is extended or adjusted under 35 U.S.C. 154(b) by 0 days.

(21) Appl. No.: 18/132,841

(22) Filed: Apr. 10, 2023

Related U.S. Application Data

(63) Continuation of application No. 17/066,901, filed on Oct. 9, 2020, now Pat. No. 11,708,187.

(51) Int. Cl.
*B65C 9/18* (2006.01)

(52) U.S. Cl.
CPC .......... *B65C 9/1865* (2013.01); *B65C 9/1892* (2013.01)

(58) Field of Classification Search
CPC ................ B65C 9/1865; B65C 9/1892; B65C 2210/0078; B65C 2210/0072; B65H 23/035; B65H 23/26; B65H 75/247
See application file for complete search history.

(56) References Cited

U.S. PATENT DOCUMENTS

| | | | | |
|---|---|---|---|---|
| 3,485,414 | A | 12/1969 | Dinter | |
| 4,624,734 | A * | 11/1986 | Voltmer | B65C 9/36 156/542 |
| 5,447,379 | A * | 9/1995 | Pou | B41J 3/36 400/120.16 |
| 5,674,350 | A | 10/1997 | Jurgich | |
| 5,736,001 | A | 4/1998 | Samuelson | |
| 5,770,007 | A | 6/1998 | Czech | |
| 5,902,449 | A | 5/1999 | Moore | |
| 6,398,069 | B1 | 6/2002 | O'Brien | |
| 2004/0155052 | A1 | 8/2004 | Fore | |
| 2006/0027333 | A1 | 2/2006 | Takami | |
| 2008/0110558 | A1 | 5/2008 | Harkins | |
| 2011/0020577 | A1 | 1/2011 | Crossley | |
| 2013/0175418 | A1 | 7/2013 | Sternberg | |
| 2014/0203234 | A1 | 7/2014 | Ninomiya et al. | |

FOREIGN PATENT DOCUMENTS

JP 2010083086 A * 4/2010

* cited by examiner

*Primary Examiner* — George R Koch
(74) *Attorney, Agent, or Firm* — Robert J. Yarbrough of Lipton, Weinberger & Husick

(57) ABSTRACT

A label dispenser for peel-off labels pulls a web with peel-off labels attached from a label supply location to a take-up spool. The label dispenser maintains the web in a taut condition when the web passes over a peeling edge by providing first and second rods about which the web wraps in a sinuous flow path on the feed side of the peeling edge. The take-up spool resists turning in the reverse direction to maintain the web in a taut condition. A cam is selectably rotatable about an axis that is spaced apart from the center of curvature at each location on the curved surface that may contact the web to adjust the thickness of the flow path of the web at the peeling edge.

20 Claims, 9 Drawing Sheets

Text

PEEL-OFF LABEL DISPENSER, SYSTEM AND METHOD

This application is continuation of Ser. No. 17/066,901, filing date 10/09/2020, now U.S. Pat. No. 11,708,187 B1.

I. BACKGROUND OF THE INVENTION

A. Field of the Invention

The Invention is a dispenser for peel-off labels. The label dispenser is self-tensioning and may receive labels in a folded condition or labels that are on rolls. The system of the Invention is a combination of the label dispenser and compatible labels with a perforated substrate. The method of the Invention is a method for using the dispenser with the compatible labels.

B. Statement of the Related Art

Peel-off labels are known in the art. As used in this document, 'peel-off label' means a paper, vinyl, nylon, polyester, polyamide or other sheet material that is coated on one side with a pressure-sensitive adhesive. As used in this document, the term 'sheet material' means paper or any other material that has a thickness that is small compared to its length and width. Alternatively, the peel-off label may comprise heat shrink tubing.

For handling, storage, transportation and use, a plurality of the peel-off labels are adhered on an elongated web in a longitudinally-spaced relationship along a longitudinal direction on the web. The web is composed of a sheet material that may have a release agent disposed on one side. The pressure-sensitive adhesive and peel-off label weakly adhere to the release agent. When a peeling force applied to the peel-off label exceeds the peeling threshold of the weak adhesive-to-release-agent bond, the peel-off label peels from the web. The peel-off label retains the pressure sensitive adhesive and may be adhered to an object to be labelled. The peel-off label may include indicia to, for example, identify the object to which the label will be applied.

The web carrying the peel-off labels and adhesive may be disposed on a roll. The free end of the web is unrolled to make peel-off labels available for use. The web may feature rows of perforations between adjacent peel-off labels. As used in this document, the term 'row of perforations' means two or more holes penetrating the web across the width of the web. The holes may be of any shape. Each row of perforations causes a locally weak condition of the web, promoting folding of the web at the row of perforations. The web supporting the peel-off labels may be disposed as an accordion fold stack of the web with peel-off labels and adhesive attached. The web is folded at the row of perforations. The web is pulled from the stack to make peel-off labels available for use.

Peel-off label dispensers are known in the art. The typical prior art label dispenser separates the label and pressure-sensitive adhesive from the web by passing the web over a peeling edge at an acute angle. Because of the abrupt change in direction, the area of adhesive pulling the label in the new direction is small and the force applied by the adhesive to the label in the new direction is small. As a result, the peeling threshold to remove the label from the web is small. The relatively large area of label adhered to the web behind the leading edge and the stiffness of the label continue to hold the label in the original direction. The peeling force resulting from the stiffness of the label resisting the change in direction is greater than the peeling threshold of the weak adhesive-to-release agent bond, so the label separates from the web at the peeling edge. The length of the label peels from the web as the web moves across the peeling edge.

A label dispenser must maintain the acute angle and abrupt change of direction of the web at the peeling edge for peeling to be effective. Prior art solutions to maintaining the acute angle of the web at the peeling edge include:

a. Using constant torque pinch rollers to both feed and take-up the web across the peeling edge (U.S. Pat. No. 3,485,414 to Dinter issued May 13, 1968);
b. Applying an air pressure differential across a perforated plate to hold the web to the plate in advance of the peeling edge (U.S. Pat. No. 5,902,449 to Moore issued May 11, 1999);
c. applying weighted rollers supported by the object to be marked to apply tension to the web after the peeling edge and at the peeling edge (U.S. Pat. No. 6,398,069 to O'Brien issued Jun. 4, 2002);
d. using a powered platen to both drive and take up the web on either side of the peeling edge (U.S. Patent Publication 2006/0027333 by Takami published Feb. 9, 2006).

A high-volume application for peel-off labels is in the wiring harness industry. Wiring harnesses are used in virtually every device that uses electrical connections, from ships to toasters. A wiring harness may include hundreds of wires. The wires in a wiring harness are labeled to prevent mistakes during assembly of the electrical device and to ease maintenance of the completed device. One of the ways in which the wires may be labeled is by using peel-off labels.

The peel-off labels used for wiring harness assembly may be composed of a film of a synthetic polymer that is substantially thinner than the general purpose peel-off labels used, for example, to label file folders or to address envelopes. The adhesive used for peel-off labels in the wiring harness industry is also strong and durable because the peel-off label may label a wire in a completed product for years if not decades. The thin nature of the peel-off labels and the strong and durable nature of the pressure-sensitive adhesive make the wiring harness industry peel-off labels particularly difficult to peel from the web. Another confounding factor in the wiring harness industry is the differences in the web supporting different peel-off labels. The web for peel-off labels for use in the wiring harness industry varies between light and flexible to stiff and inflexible.

What is needed is a label dispenser that can dispense peel-off labels that are different sizes and composed of thin films of polymer, using a strong and durable pressure-sensitive adhesive, from webs that vary in thickness and stiffness from thin and flexible to thick and stiff. The prior art does not teach the apparatus, system or method of the Invention.

II. DESCRIPTION OF THE INVENTION

The label dispenser of the Invention separates peel-off labels with pressure sensitive adhesive from a web on demand by a user. The web with the peel-off labels attached may feed from a roll of the web or from accordion folds of the web. The web with the peel-off labels attached moves along a flow path over a peeling edge and abruptly changes direction at an acute angle, which causes the peeling force on the peel-off label to exceed the peeling threshold of the weak adhesive-to-release agent bond. The peel-off label therefore peels from the web at the peeling edge.

To maintain the acute angle and the abrupt change in direction, the label dispenser maintains tension on the web at both the feed side of the peeling edge and the take-up side of the peeling edge. As used herein, 'feed side' means the flow path of the web with adhered peel-off labels before the peeling edge. As used herein, the term 'take-up side' means the flow path of the web with peel-off labels removed after the peeling edge. The label dispenser applies tension to the web on the take-up side of the peeling edge by a thumb wheel on a take-up spool. The user turns the thumb wheel to rotate the take-up spool, wrapping the web about the take-up spool and pulling the web from the label supply, past the peeling edge and to the take-up spool.

The label dispenser maintains tension on the feed side of the peeling edge by providing a serpentine flow path for the web defined by two closely-spaced rods. As the web passes over and between the two rods, the stiffness of the web and peel-off label combination causes the web to resist bending about the rods and, combined with the friction of the web on the two rods, causes the the web to resist being pulled past the rods. Turning the thumb wheel by the user therefore results in a taut web from the two closely-spaced rods to the take-up spool and an acute angle of the web at the peeling edge.

The serpentine flow path defined by the two rods is particularly effective for tensioning a web that features rows of perforations, as previously defined, across the width of the web between adjacent labels. Each row of perforations weakens the web in flexure at the location of the perforations. When the web bends, the web will fold at the row of perforations. When the take-up spool pulls the web so that a row of perforations reaches the first rod, the web will tend to fold at the row of perforations, providing a sharper change in direction of the web at the fold and resisting the pulling of the web. When the row of perforations reaches the second rod, the web may change direction by more than 180 degrees and the web may fold in the opposite direction at the row of perforations. As the location of the web with the row of perforations moves in contact with the second rod, the resistance to the pulling of the web is substantially increased over the web pulling resistance in the absence of the row of perforations.

The row of perforations is most effective to tension the feed side of the web to initiate peeling if the location on the web of the row of perforations is in contact with the second rod when the leading edge of the peel-off label reaches the peeling edge. As a result, the label dispenser is most effective for webs having rows of perforations if the distance along the flow path between the peeling edge and the surface of the second rod that the web contacts (the 'feed distance') is a whole number multiple of the distance between adjacent rows of perforations on the web (the 'perforation distance'). The label dispenser may provide two or more mounting locations for the first and second rods to select the distance between the peeling edge and the second rod to accommodate peel-off labels of different sizes and to achieve a suitable feed-side tension when the leading edge of each peel-off label reaches the peeling edge.

The web abruptly changes direction at an acute angle at the peeling edge, causing the peel-off label to peel from the web. When the trailing edge of the label reaches the peeling edge, the trailing edge adheres to the web and makes the turn to the new direction with the web. The pressure-sensitive adhesive on the now-separated label collides with and adheres to a helical collection spring. The helical collection spring provides a very small surface area to the pressure-sensitive adhesive and so the peel-off label may be readily removed from the helical collection spring by the user.

When the user releases the thumb wheel, the tension on the web may be released. The label dispenser nonetheless must maintain the acute angle of the web over the peeling edge with little or no slack in the web so that the next label will immediately peel from the web at the peeling edge when the user again turns the thumb wheel. The label dispenser maintains the acute angle between uses:

(a) by providing a defined flow path for the web on the feed side of the web up to the peeling edge, (b) by providing that the take-up spool resists rotation of the spool in the reverse direction, and (c) by utilizing a perforated web with the perforations disposed between adjacent labels.

Each of the above features is discussed below.

The Defined Flow Path

As to (a) above, the defined flow path for the web up to the peeling edge is defined by the two closely-spaced rods, by a movable cam, and by the peeling edge in combination. The web coming from the first and second rods passes between the cam and the lip supporting the peeling edge. The thickness of the defined flow path adjacent to the peeling edge is user-selectable by moving the cam. The cam is selectably rotatable about a cam axis of rotation. The cam axis of rotation is in a spaced-apart relation to the center of curvature of each location on the surface of the cam that may contact the web as the web moves along the flow path. As a result, the cam defines an eccentric and may be rotated to move the cam (and hence the defined flow path) closer to or further away from the peeling edge. The cam position defines the thickness of the flow path immediately prior to the peeling edge and adjusts the acute angle of the flow path across the peeling edge The cam may be in the shape of a cylinder, a semicylinder, or any other portion of a cylinder sectioned longitudinally. The cam may be in the shape of any other curve that is extended normal to the curve, such as an ovoid, ellipse, parabola or an irregular curve.

Resisting Take-Up Spool Motion in the Reverse Direction

As to (b) above, the take-up spool may include an interference fit or a friction clutch to prevent free rotation of the take-up spool and resist the take-up spool rotating in the reverse direction. The interference fit or clutch allows one-handed operation of the label dispenser by a user. In the absence of the interference fit or clutch, the take-up spool would unroll and cause slack in the web. The presence of slack could require the user to grip, turn, and release the thumb wheel multiple times to dispense a single label or to use two hands to dispense a label. Providing the interference fit or clutch allows the user to grip, turn and release the thumb wheel with one hand and without unrolling of the web on the take-up spool.

While an interference fit or friction clutch is effective and economical to resist rotation of the take-up spool in the reverse direction, a one-way clutch such as a ratchet-and-pawl or Sprague clutch also is effective. Rather than a thumb wheel, the take-up spool may be turned manually by a crank, lever, or foot pedal. The take-up spool may be powered, as by an electrical motor, a pneumatic cylinder, or a power spring. The take-up spool may be indexed, so that a single activation of the take-up spool dispenses one or more labels.

Web with Rows of Perforations

As to (c) above, the label dispenser may be used with a web that features labels longitudinally arranged on the web and rows perforations, as previously defined, extending laterally between adjacent labels. Each row of perforations is structurally weak in flexure compared to locations on the web without perforations. The web will fold at the perforations. When the user turns the thumb wheel so that a label is dispensed and the row of perforations reaches the peeling edge, the web folds at the row of perforations and extends toward the take-up spool at the acute angle. The fold in the web at the peeling edge due to the perforations provides additional resistance to movement of the web, both toward the take-up spool and toward the label supply location, reducing slack in the web between the peeling edge and the take-up spool and between the peeling edge and the second rod.

The user may release the thumb wheel, for example to remove and apply the dispensed label. When the user returns to the label dispenser, the web will move immediately when the user begins to turn the thumb wheel. The increase in resistance to turning the thumb wheel that occurs when the perforations reach the peeling edge allows the user to tactilely feel when the label has been fully dispensed, allowing the user to operate the label dispenser without looking at the label dispenser.

The take-up spool may be located vertically below or above the peeling edge. The combination of the taut web and the vertical orientation of the take-up spool and peeling edge provides that the taut web gives tactile feedback to a user retrieving a label from the helical spring. A user can reach for a dispensed label without looking at the label dispenser. The user's hand will encounter the taut web above the take-up spool and the user then will move his or her hand vertically until he or she touches a label adhering to the helical spring. The user may both advance the thumb wheel and retrieve the dispensed label without looking at the label dispenser.

The label dispenser may include a rod to hold a roll of peel-off labels. The label dispenser may dispense very thin labels, as are used in the wiring harness industry, and may dispense peel-off labels on webs of different thicknesses.

III. BRIEF DESCRIPTION OF THE DRAWINGS

IV. DESCRIPTION OF AN EMBODIMENT

Figure 1:
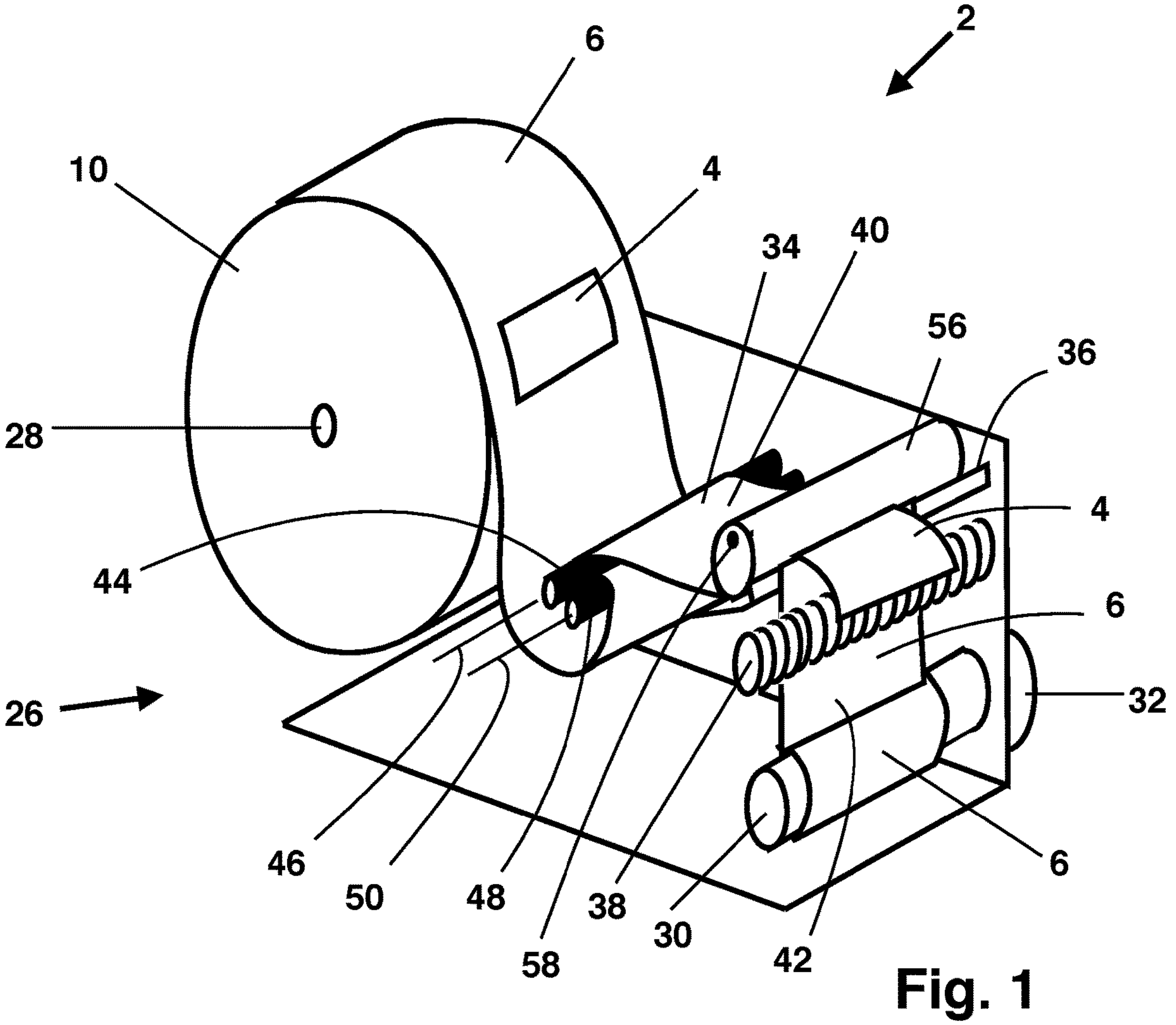
FIG. 1 is a cutaway perspective view of the label dispenser loaded with a roll of peel-off labels.
Figure 2:
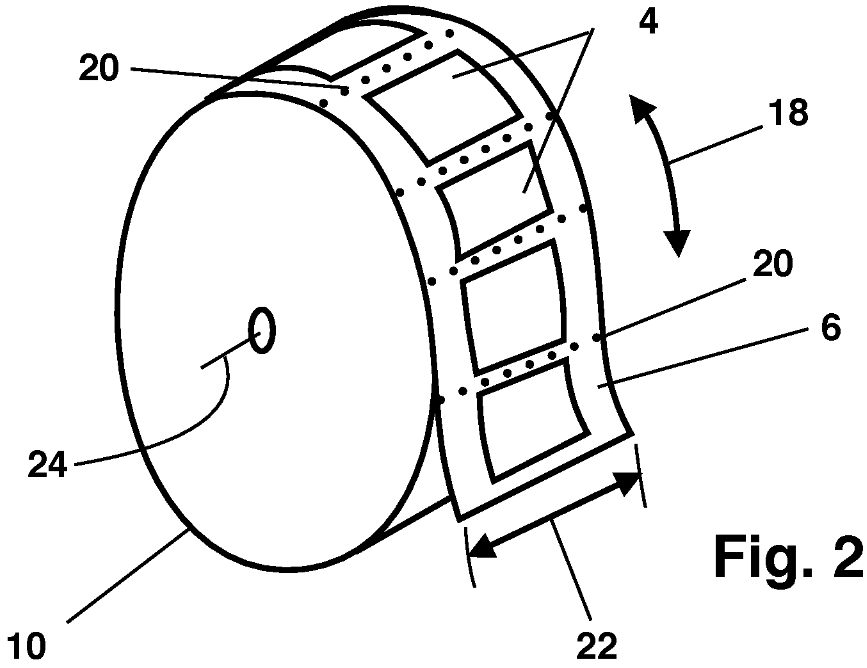
FIG. 2 is a perspective view of a roll of peel-off labels.
Figure 3:
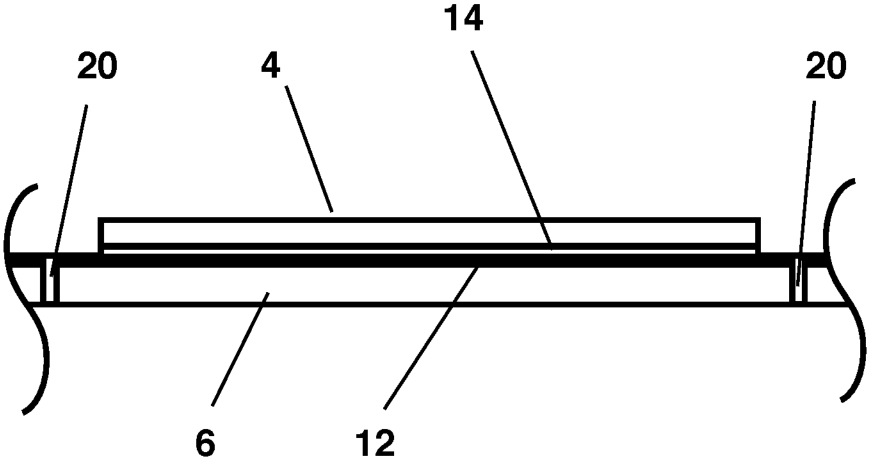
FIG. 3 is a detail side view of a peel-off label

The Invention is a label dispenser 2 for separating peel-off labels 4 from a web 6 so that the peel-off label 4 may be adhered to an object to be labeled, for example a wire or connector in a wiring harness. FIG. 1 is a perspective view of the label dispenser 2 loaded with a roll 10 of peel-off labels 4 and with a dispenser side 8 cut away to show the internal components of the label dispenser 2. FIGS. 2 and 3 show a roll 10 of the peel-off labels 4 and a detail side view of a peel-off label 4, respectively.

Figure 8:
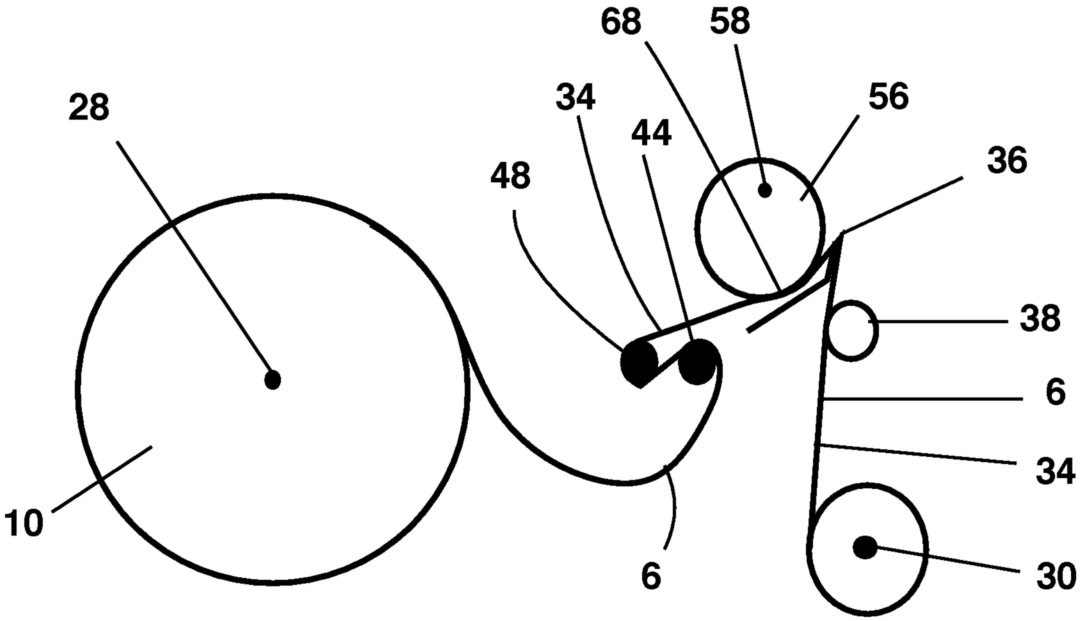
FIG. 8 is a section side view of the label dispenser drawing labels from a roll of peel-off labels.
Figure 9:
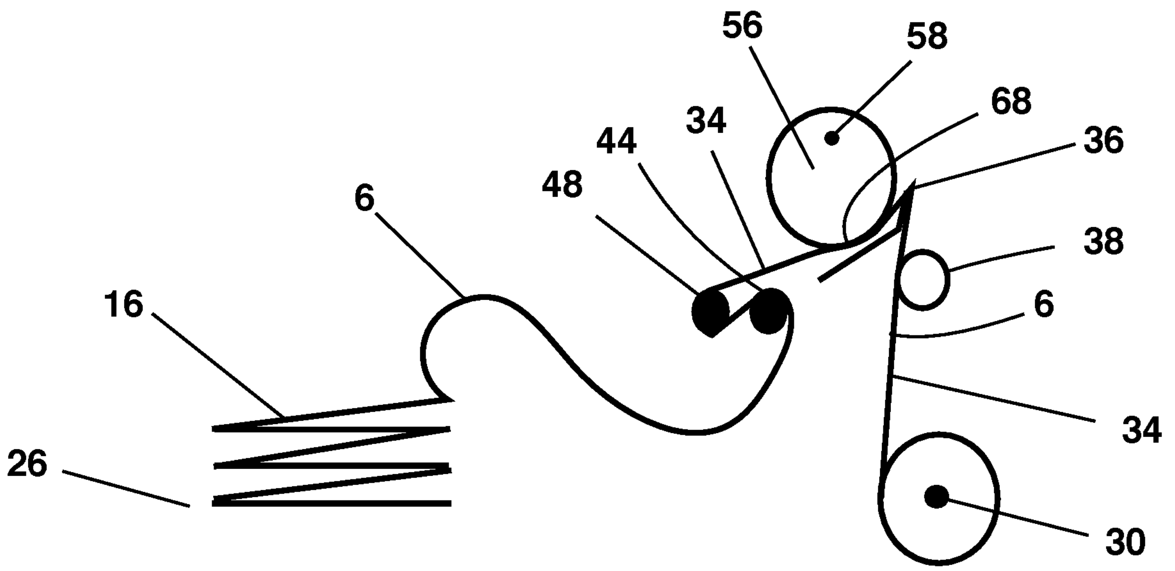
FIG. 9 is a section side view of the label dispenser drawing labels from an accordion stack of peel-off labels.

From FIGS. 2 and 3, the peel-off labels 4 are adhered weakly by a pressure-sensitive adhesive 14 to a release agent 12 on a web 6. The web 6 may be disposed in a roll 10, as shown by FIGS. 1 and 8, or as an accordion-fold stack 16, as shown by FIG. 9. The peel-off labels 4 are disposed on the web 6 in a spaced-apart relation along the longitudinal direction 18 of the web 6. The label dispenser 2 will serially peel peel-off labels 4 from the web 6, as described below. The roll 10 has a roll axis of rotation 24 and unrolls to feed peel-off labels 4 through the label dispenser 2. When the peel-off label 4 is peeled from the web 6, the pressure-sensitive adhesive 14 remains with the peel-off label 4, ready to adhere the peel-off label 4 to the object to be labeled.

As shown by FIGS. 2 and 3, the web 6 may feature lines of perforations 20. The lines of perforations 20 extend across the width 22 of the web 6 and penetrate the web 6 and the release agent 12. The lines of perforations 20 locally weaken the web 6 in flexure, so that the web 6 may readily fold at the perforations 20.

From FIGS. 1, the label dispenser defines a label supply location 26 from which the web 6 is dispensed with the peel-off labels 4 attached. The label supply location 26 may comprise a roll support rod 28 to support the roll 10 of peel-off labels 4. Additionally or alternatively, the label supply location 26 may support an accordion-fold stack 16 of peel-off labels 4 as shown by FIG. 9.

From FIG. 1, the label dispenser includes a take-up spool 30. The take-up spool 30 receives the web 6 after the peel-off labels 4 are peeled from the web 6. The take-up spool 30 is rotated to apply tension to the web 6 and pull the web 6 and peel-off labels 4 through the label dispenser 2. A user may turn the take-up spool 30 manually using a thumb wheel 32 as shown by FIGS. 1, 6, 7, 10 and 11. Alternatively, the user may turn the take-up spool 30 manually using a crank or foot pedal operably attached to the take-up spool 30. An electric or pneumatic motor or hydraulic cylinder may turn the take-up spool 30.

From FIGS. 1, 8 and 9, the label dispenser 2 defines a flow path 34 for the web 6 as the web 6 travels through the label dispenser 2 between the web feed location 26 and the take-up spool 30. As the web 6 travels along the flow path 34, the web 6 with peel-off labels 4 attached passes over a peeling edge 36. At the peeling edge 36, the web 6 changes direction abruptly and at an acute angle. Because of the stiffness in flexure of the peel-off label 4, the peel-off label 4 resists bending around the peeling edge 36. Because of he abrupt change in direction and acute angle of the web 6, the area of the pressure-sensitive adhesive 14 pulling the peel-off label 4 in the new direction is small. As a result, the stiffness and resistance to flexure of the peel-off label 4 exceeds the peeling threshold of the adhesive bond of the pressure-sensitive adhesive 14 to the release agent 12 and the peel-off label 4 peels from the web 6 as the web passes over the peeling edge 36.

As the trailing edge of the peel-off label 4 peels from the web 6, the peel-off label 4 is pulled by the web 6 past the peeling edge 36 and is collected on a helical collection spring 38. The helical collection spring 38 may be a helical metal or polymer spring supported by a rod. Alternatively, the helical collection spring 38 may be any structure that has a very small surface area to which the pressure sensitive adhesive can adhere. The helical collection spring 38 provides adequate surface area for adhesion for temporary storage of the peel-off label 4, but not enough surface area that the user cannot readily remove the peel-off label 4 from the helical collection spring 38.

To ensure that the change in web 6 direction is both abrupt and acute at the peeling edge 36, the web 6 must be taut on both the feed side 40 and take-up side 42, as previously defined, of the peeling edge 36. The web 6 on the take-up side 42 of the peeling edge 36 is placed in a taut condition by the tension applied by the take-up spool 30.

Figure 5:
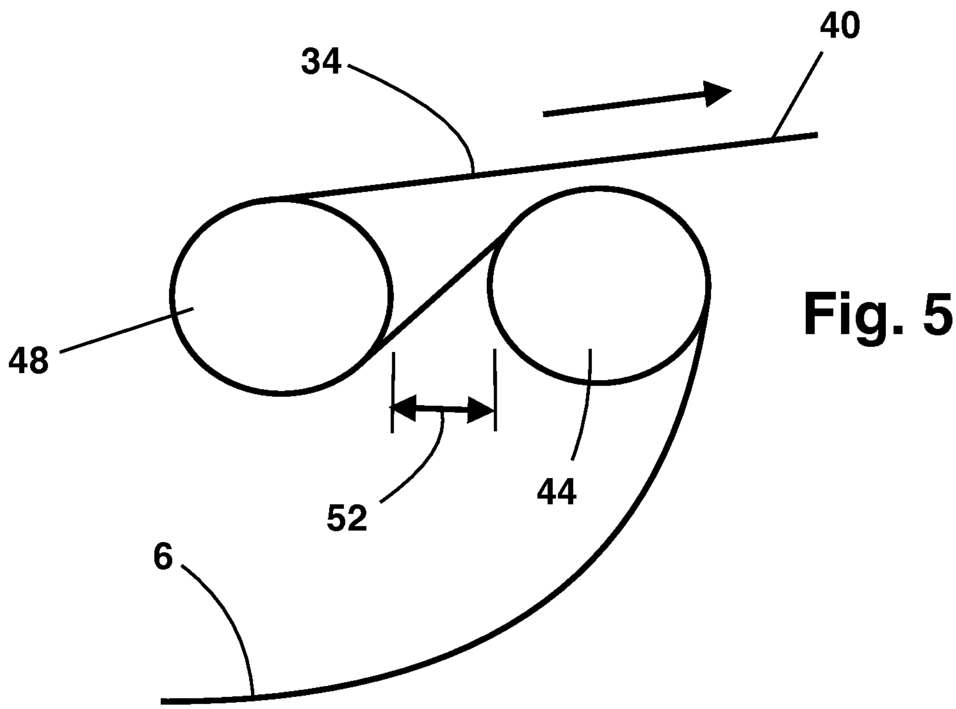
FIG. 5 is a detail side view of the flow path of the web at the first and second rods.

From FIGS. 1 and 5, to maintain the web 6 on the feed side 40 in a taut condition, the label dispenser 2 utilizes a first rod 44 having a first rod longitudinal axis 46 and a second rod 48 having a second rod longitudinal axis 50. The longitudinal axes 46, 50 of the first and second rods 44, 48 are oriented normal to the longitudinal direction 18 of the web 6 and parallel to the width 22 of the web 6. The lengths of the first and second rods 44, 48 may be greater than the width 22 of the web 6. From the web supply location 26, the web 6 following the web flow path 34 wraps about the first rod 44 and about the second rod 48. The web 6 reverses direction around both the first and second rods to move toward the take-up spool 30.

From FIG. 5, the diameters of the first and second rods 44, 48 are adequately large that the peeling threshold is not exceeded and the peel-off labels 4 do not peel from the web 6 as the web 6 wraps about the first and second rods 44, 48. The arrow on FIG. 5 indicates the direction of travel of the web 6. The first and second rods 44, 48 are spaced apart by a separation distance 52 greater than the thickness of the web 6 with the peel-off labels 4 attached. While the first and second rods 44, 48 may be separated by any greater separation distance 52, a separation distance 52 of less than the diameter of the first or second rod 44, 48 has proven suitable in practice. The location of the first and second rods 44, 48, the distance between the first and second rods 44, 48 and the flow path 34 may be selected so that the web 6 wraps about more than 180 degrees of the circumference of the second rod 48. While the first and second rods 44, 48 are illustrated as being circular in cross section, the first and second rods 44, 48 may be of any other suitable shape, such as elliptical or ovoid.

The resistance to bending of the web 6 with the peel-off labels 4 attached as the web 6 and labels 4 pass through the serpentine flow path 34 created by the first and second rods 44, 48 coupled to the friction of the web 6 and peel-off labels 4 passing over the first and second rods 44, 48 resist pulling of the web 6 by the take-up spool 30. As a result, the take-up spool 30 may pull taut the web 6 on the feed side 40 of the peeling edge 36.

Figure 4:
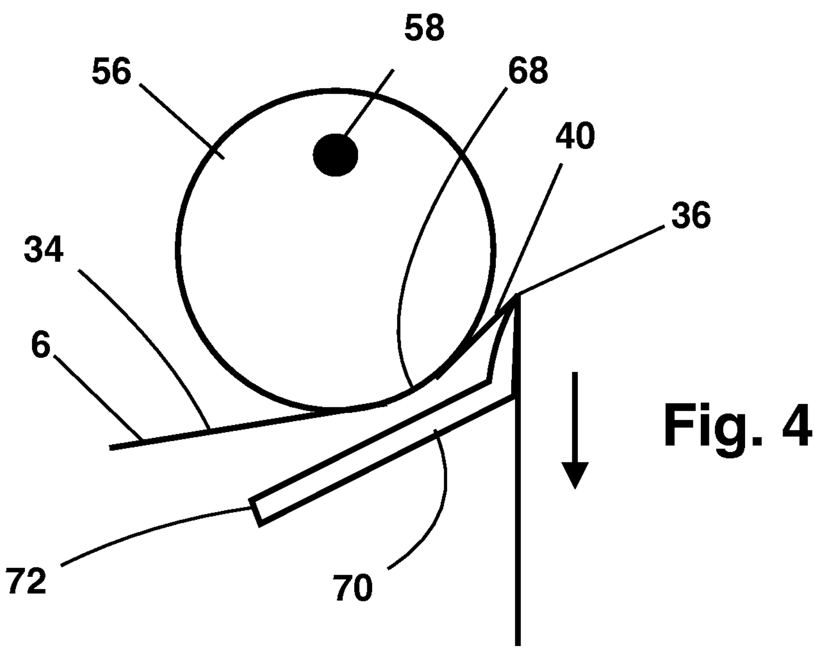
FIG. 4 is a detail side view of the flow path of the web at the peeling edge.

From FIGS. 1 and 4, to control the acute angle at which the web 6 changes direction at the peeling edge 36, the label dispenser 2 features a cam 56. The arrow on FIG. 4 indicated the direction of travel of the web 6. The web 6 following the flow path 34 passes between the cam 56 and the peeling edge 36 immediately before the web 6 passes over the peeling edge 36.

The cam 56 is movable to select a separation distance between cam 56 and the peeling edge 36. The separation distance is at least the thickness of the web 6 with the peel-off label 4 attached, but may be greater than the minimum thickness. Once the user moves the cam 56 and thereby selects the separation distance, the cam 56 will remain in the selected position with respect to the peeling edge 36 until the user again moves the cam 56.

To move the the cam 56, the cam 56 is selectably rotatable about a cam axis of rotation 58. The cam 56 defines a curved surface 68 that may contact the web 6 as the web moves along the feed path 34. The cam axis of rotation 58 is in a spaced apart relation to the center of curvature of the curved surface 68 of each location on the cam 56 that may contact the web 6 as the web 6 passes between the cam 56 and the peeling edge 36. As a result, the cam 56 defines an eccentric and the rotation of the cam 56 changes the separation distance between the cam 56 and peeling edge 36 through which the web 6 will pass.

The cam 56 may be retained in the selected position by any mechanism known in the art, such as a threaded fastener, pin, clip, clutch, detent, or other mechanism for selectably retaining an object in a rotatable position.

As shown by FIG. 4, a non-planar lip 70 supports the peeling edge 36 and an opposing lip second end 72. The flow path 34 passes between the lip second end 72 and the cam 56 on the feed side 40 of the label dispenser 2. The thickness of the flow path 34 at the lip second end 72 is greater than the thickness of the flow path 34 at the peeling edge 36 when the cam 56 is in contact with the web 6.

FIGS. 1, 4, 6, 7, 8 and 9 show the cam 56 as being circular or ovoid in cross section; however, the cam 56 may be of any other suitable shape. For example, the cam 56 may define a semicylinder or other portion of a cylinder or may be elliptical or parabolic or an irregular curve or any other curve in cross section, provided that the axis of rotation of the cam 56 is in a spaced apart relation to the center of curvature of any point on the curve that may contact the web 6 as the web 6 moves along the flow path 34.

Figure 6:
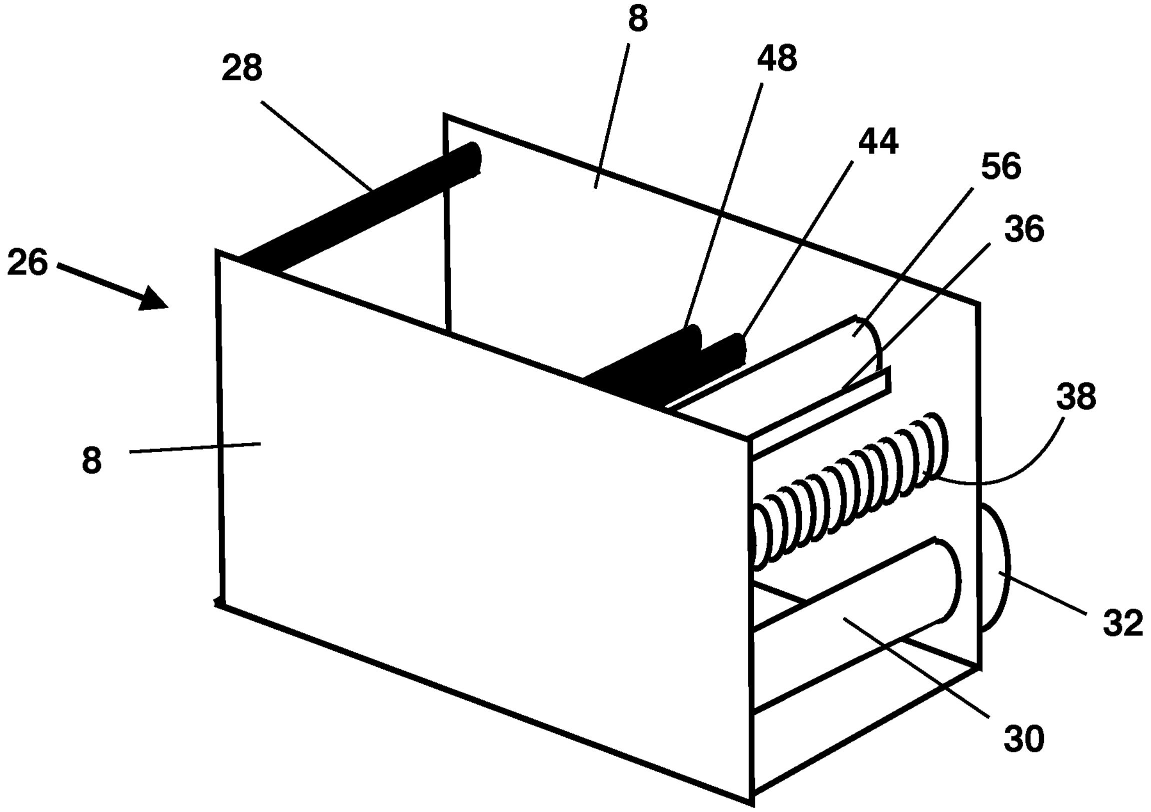
FIG. 6 is a perspective view of the label dispenser without peel-off labels.
Figure 7:
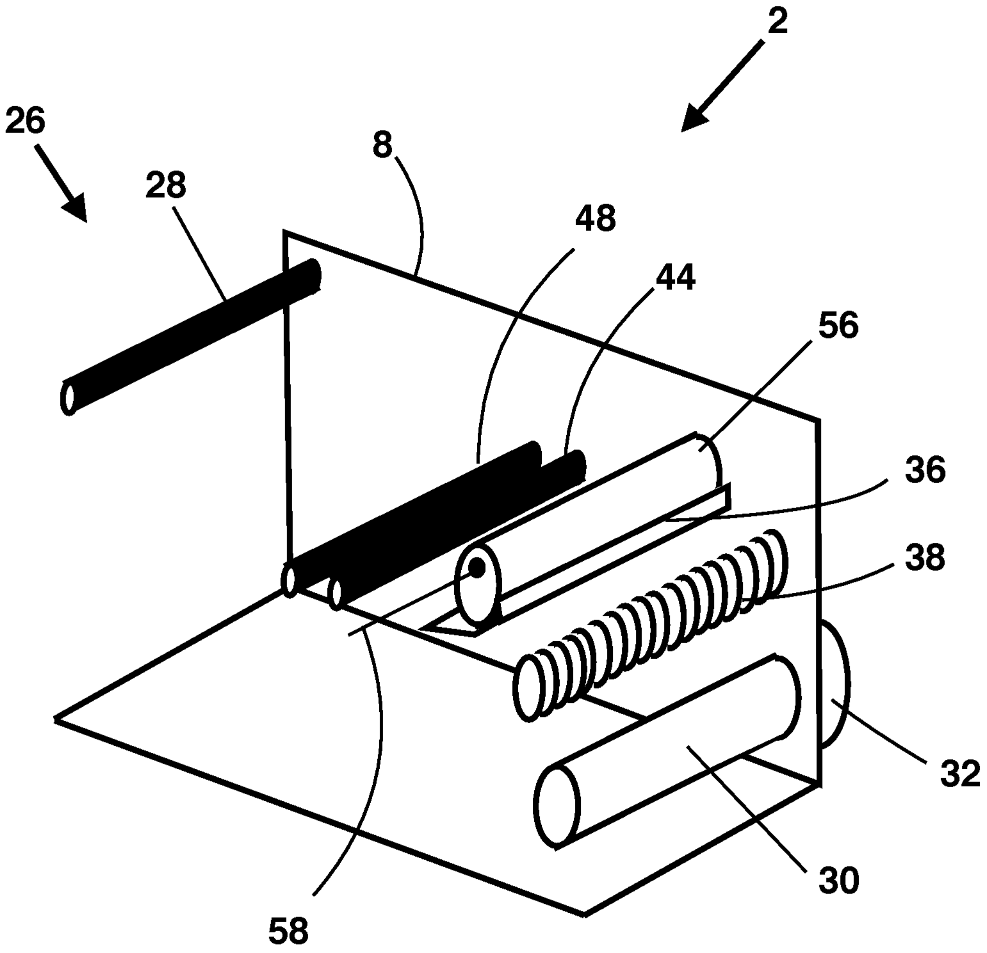
FIG. 7 is a cutaway view of the label dispenser of FIG. 6.

FIGS. 6 and 7 are perspective views of the label dispenser 2 without the web 6 and peel-off labels 4. FIG. 6 shows the dispenser side 8 in place and FIG. 7 shows the label dispenser 2 with the dispenser side 8 removed to show the internal parts of the label dispenser 2.

FIG. 8 shows the flow path 34 of the web 6 from the roll 10 of peel-off labels 4 to the take-up spool 30 as the take-up spool 30 is rotated to move the web 6 through the label dispenser 2. From the roll 10 of peel-off labels 4, the web 6 wraps about the first rod 44, reversing direction and wrapping about the second rod 48. The web 6 again reverses direction and passes between the cam 56 and the peeling edge 36.

From FIG. 8, the web 6 with peel-off labels 4 attached is relatively stiff and resists changing direction around the first and second rods 44, 48. The stiffness of the web 6 and peel-off labels 4, combined with the friction of the web 6 wrapped about the first and second rods 44, 48, causes the web 6 to resist moving through the first and second rods 44, 48 toward the take-up spool 30. The tension applied to the web 6 by the combination of the first and second rods 44, 48 and the take-up spool 30 causes the web to be taut when the web passes over the peeling edge 36.

At the peeling edge 36, the taut web 6 changes direction abruptly and at an acute angle, causing the peel-off labels 4 to separate from the web 6. The peel-off labels 4 with the pressure sensitive adhesive 14 attached are captured by the helical collection spring 38, ready for application by the user to an object to be labelled. The web 6, now separated from the peel-off label 4, continues to the take-up spool 30.

FIG. 9 is similar to FIG. 8, except that the supply of peel-off labels 4 is drawn from an accordion-fold stack 16 of peel-off labels 4 at the label supply location 26. The web 6 is perforated, as described above, to allow ready folding of the web 6 between the peel-off labels 4 adhered to the web 6.

Figure 10:
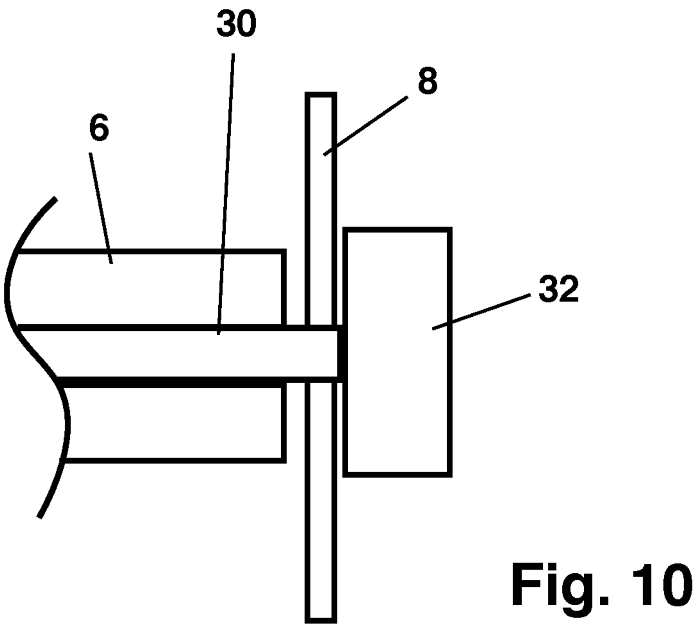
FIG. 10 is a side section view of an interference fit of the take-up spool.
Figure 11:
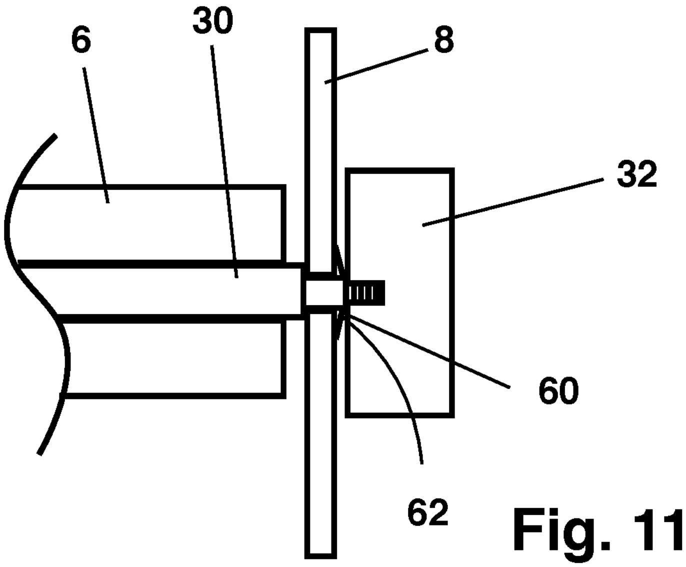
FIG. 11 is a side section view of a friction clutch on the take-up spool.

FIGS. 10 and 11 are section views showing example mechanisms to provide that the take-up spool 30 resists turning in the reverse direction when the turning force on the take-up spool 30 is released. By preventing the take-up spool 30 from turning in the reverse direction, the web 6 is maintained in a taut condition over the peeling edge 36 even 3.6 when the label dispenser 2 is not in active use. The label dispenser 2 is therefore ready to immediately begin dispensing peel-off labels 4 as soon as the user turns the take-up spool 30.

In FIG. 10, the take-up reel 30 passes through an opening in the label dispenser wall 8 in an interference fit. The interference fit provides resistance to turning of the take-up reel 30.

In FIG. 11, a clutch 60, in this instance a friction clutch 62, bears on both the thumb wheel 32 and the label dispenser wall 8, resisting turning of the take-up spool 30. The friction clutch 62 may comprise a wave spring that is compressed by a threaded connection. The clutch may be a one-way clutch, such as a ratchet and pawl or a Sprague clutch, as are known in the art of one-way motion control.

The thumb wheel 32 is one manner in which a user may manually turn the take-up spool 30. Rather than or in addition to the thumb wheel 32, the user may turn a crank or may move a foot pedal to turn the take-up spool 30, advance the web 6 and dispense peel-off labels. Alternatively, the take-up spool 30 may be powered by a motor or spring, such as an electric or pneumatic motor, hydraulic cylinder, or a power spring.

Figure 12:
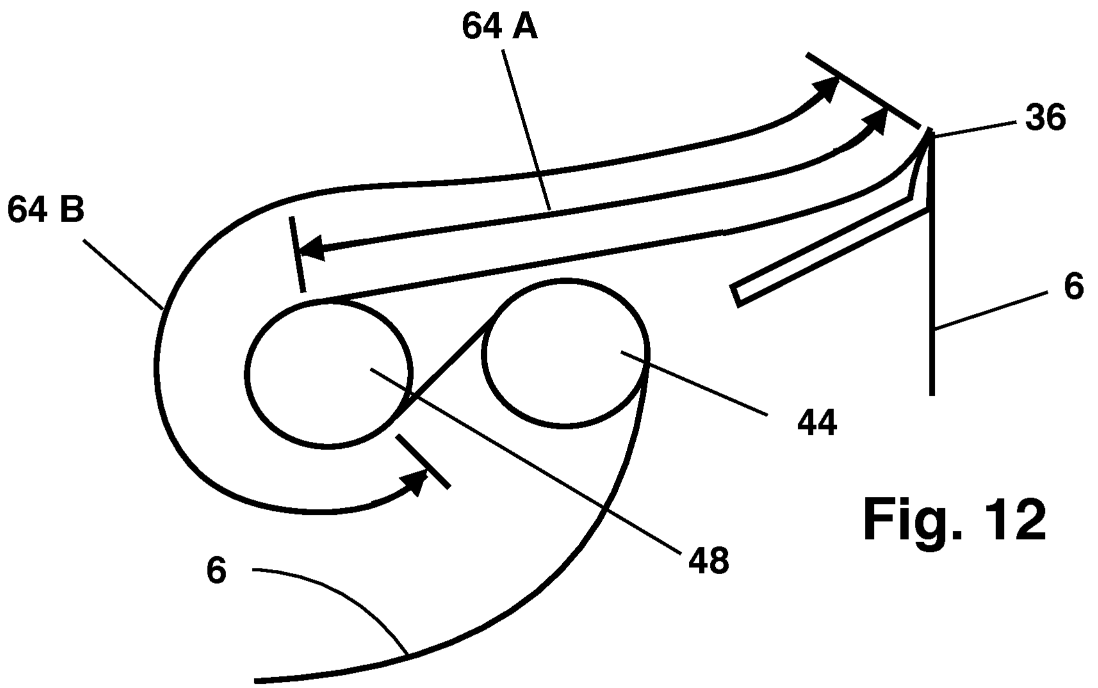
FIG. 12 illustrates the minimum and maximum values for the feed distance.
Figure 13:
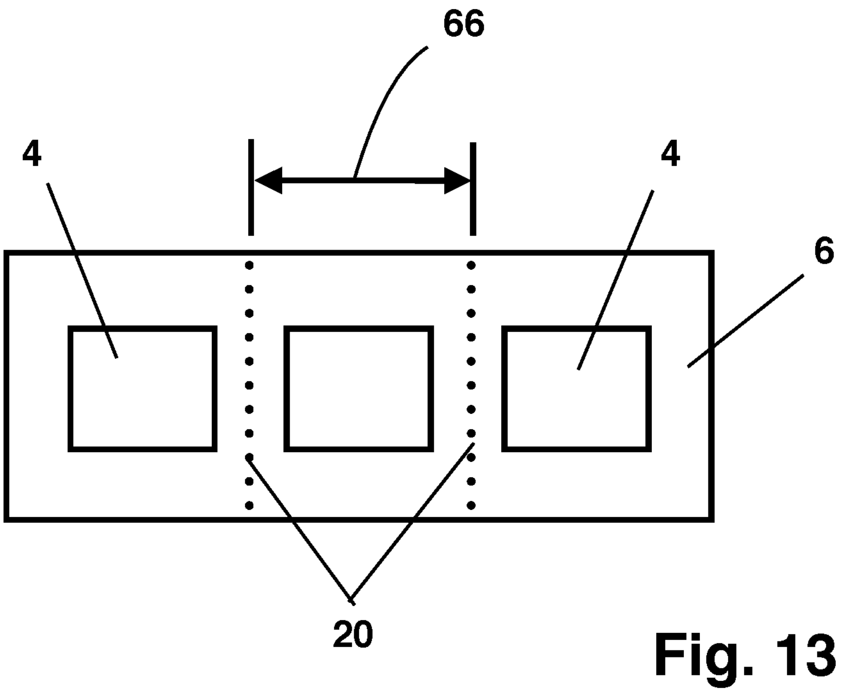
FIG. 13 illustrates the penetration distance.

FIGS. 12 and 13 illustrate that the first and second rods 44, 48 are most effective for providing tension on the feed side of the peeling edge when the feed distance 64A and 64B is a whole number multiple of the perforation distance 66. As shown by FIG. 13, the perforation distance 66 is the distance between adjacent lines of perforations 20 across the width 22 of the web 6.

From FIG. 12, the feed distance 64A and 64B is the distance along the flow path 34 that the web 6 travels starting at a location at which the web 6 touches the second rod 48 and ending at the peeling edge 36. Because the web is wrapped about more than half the circumference of the second rod 48, the feed distance is nota single value and is instead a range of values dependent on the diameters of the first and second rods 44, 48 and the separation distance 52 between the first and second rods 44, 48. The minimum value for the feed distance along the flow path 34 is indicated by arrow 64A on FIG. 12. The maximum value for the feed distance along the flow path 34 is indicated by arrow 64B on FIG. 12. Any feed distance value between the minimum 64A and maximum 64B that is a whole number multiple of the perforation distance is effective. The label dispenser may be most effective when a row of perforations 20 is in contact with the second rod when the leading edge of a peel-off label 4 reaches the peeling edge 36 because the tendency of the web 6 to fold at the row of perforations 20 increases the resistance to movement of the web 6 over the second rod 48 and hence increases the tension on the web 6 when the leading edge of the peel-off label 4 passes over the peeling edge 36.

To accommodate peel-off labels of sizes for which whole number multiples of the perforation distance 66 falls outside the minimum 64A and maximum 64B range for feed distance, the feed distance may be user-selectable. For example, the label dispenser may provide additional locations at which the first and second rods 44, 48 may be installed.

The following is a list of numbered elements from the Specification and drawings:

label dispenser 2
peel-off labels 4
a web 6
dispenser side 8
a roll 10
release agent 12
pressure-sensitive adhesive 14
an accordion-folded stack 16
a longitudinal direction 18
row of perforations 20
a width 22
roll axis of rotation 24
a label supply location 26
a roll support rod 28
a take-up spool 30
thumb wheel 32
a flow path 34
a peeling edge 36
a helical collection spring 38
a feed side 40
a take-up side 42
a first rod 44
a first rod longitudinal axis 46
a second rod 48
a second rod longitudinal axis 50
a separation distance 52
a cam 56
a cam axis of rotation 58
a clutch 60
a friction clutch 62
minimum feed distance 64A
maximum feed distance 64B
perforation distance 66
curved surface 68
Non-planar lip 70
Lip second end 72
Non-planar lip 70
Lip second end 72

I claim:

1. An apparatus for dispensing peel-off labels from a roll of peel-off labels or an accordion-folded stack of peel-off labels, the peel-off labels being adhered to a web along a longitudinal direction of the web, the web having a width normal to the web longitudinal direction, the apparatus comprising:

a. a label supply location and a flow path from the label supply location, the web being movable along the flow path from the label supply location;
b. a peeling edge, the peeling edge being disposed along the flow path, the flow path having a configuration to peel the peel-off labels from the web at the peeling edge as the web moves along the flow path;
c. the configuration of the flow path to peel the peel-off labels from the web at the peeling edge comprising a cam disposed along the flow path immediate prior to the peeling edge as the web moves along the flow path from the label supply location, the cam being movable with respect to the peeling edge, the cam being configured to bear on the web immediately prior to the peeling edge as the web moves along the flow path, the configuration of the flow path to peel the peel-off labels from the web at the peeling edge further comprising a change in a flow path direction at the peeling edge, the cam defining the change in the flow path direction at the peeling edge when the cam bears upon the web immediately prior to the peeling edge as the web moves along the flow path, the change in the flow path direction at the peeling edge as the web moves across the peeling edge being user selectable by a movement of the movable cam.

2. The apparatus of claim 1 wherein the cam in combination with the peeling edge defining a peeling edge flow path thickness across the width of the web immediately prior to the peeling edge as the web moves along the flow path, the peeling edge flow path thickness being a distance between the peeling edge and a location on the cam at which the cam bears upon the web as the web moves along the flow path, the peeling edge flow path thickness being user-selectable by the movement of the cam.

3. The apparatus of claim 2 wherein the cam has a curved surface and wherein the configuration of the cam to bear upon the web immediately prior to the peeling edge being that the curved surface bears upon the web and is movable with respect to the peeling edge immediately prior to the peeling edge.

4. The apparatus of claim 3 wherein the curved surface has a radius of curvature and a center of curvature, the cam being rotatable about an axis of rotation, wherein the axis of rotation is in a spaced apart relation to the center of curvature of the curved surface so that a rotation of the cam about the axis of rotation selects the change in the flow path direction at the peeling edge as the web moves along the flow path and the curved surface bears upon the web.

5. The apparatus of claim 4 wherein the cam is a cylinder, a semicylinder, or a section of a cylinder.

6. The apparatus of claim 1, the apparatus further comprising:

a lip, the lip being non-planar, the lip supporting the peeling edge, the peeling edge defining a lip first end, the lip extending from the peeling edge along the flow path toward the label supply location, the lip has a lip second end opposite the peeling edge, the lip in combination with the movable cam defining a lip flow path thickness, the lip flow path thickness at the lip second end is greater than the peeling edge flow path thickness immediately prior to the peeling edge when the movable cam bears upon the web.

7. The apparatus of claim 6 wherein the lip defines the peeling edge.

8. A system for dispensing peel-off labels, the system comprising:

a. a roll of peel-off labels or an accordion-folded stack of peel-off labels, the peel-off labels being adhered to a web along a longitudinal direction of the web, the web having a width normal to the web longitudinal direction;

b. a flow path of the web along the web longitudinal direction from a label supply location to a peeling edge, the flow path having a configuration to peel the peel-off labels from the web at the peeling edge, the configuration of the flow path to peel the peel-off labels from the web at the peeling edge comprising a cam disposed along the flow path immediate prior to the peeling edge as the web moves along the flow path from the label supply location, the cam being movable with respect to the peeling edge, the cam being configured to bear on the web immediately prior to the peeling edge as the web moves along the flow path, the configuration of the flow path to peel the peel-off labels from the web at the peeling edge further comprising a change in a flow path direction at the peeling edge, the cam defining the change in the flow path direction at the peeling edge when the cam bears upon the web immediately prior to the peeling edge as the web moves along the flow path, the change in the flow path direction at the peeling edge as the web moves across the peeling edge being user selectable by a movement of the movable cam.

9. The system of claim 8 wherein the cam in combination with the peeling edge defining a peeling edge flow path thickness across the width of the web immediately prior to the peeling edge as the web moves along the flow path, the peeling edge flow path thickness being a distance between the peeling edge and a location on the cam at which the cam bears upon the web as the web moves along the flow path, the peeling edge flow path thickness being user-selectable by the movement of the cam.

10. The system of claim 9 wherein the cam has a curved surface and wherein the configuration of the cam to bear upon the web immediately prior to the peeling edge being that the curved surface bears upon the web and is movable with respect to the peeling edge immediately prior to the peeling edge.

11. The system of claim 10 wherein the curved surface has a radius of curvature and a center of curvature, the cam being rotatable about an axis of rotation, wherein the axis of rotation is in a spaced apart relation to the center of curvature of the curved surface so that a rotation of the cam about the axis of rotation selects the change in the flow path direction at the peeling edge as the web moves along the flow path and the curved surface bears upon the web.

12. The system off claim 11 wherein the cam is a cylinder, a semicylinder, or a section of the cylinder.

13. The system of claim 8, the system further comprising: a lip, the lip being non-planar, the lip supporting the peeling edge, the peeling edge defining a lip first end, the lip extending from the peeling edge along the flow path toward the label supply location, the lip has a lip second end opposite the peeling edge, the lip in combination with the movable cam defining a lip flow path thickness, the lip flow path thickness at the lip second end is greater than the peeling edge flow path thickness immediately prior to the peeling edge when the movable cam bears upon the web.

14. The system of claim 13 wherein the lip defines the peeling edge.

15. A method for dispensing peel-off labels, the method comprising:

a. obtaining a roll of peel-off labels or an accordion-folded stack of peel-off labels, the peel-off labels being adhered to a web along a longitudinal direction of the web, the web having a width normal to the web longitudinal direction, b. obtaining a label dispenser having a label supply location and a flow path from the label supply location, the web being movable along the flow path from the label supply location, the label dispenser having a peeling edge, the peeling edge being disposed along the flow path, the flow path having a configuration to peel the peel-off labels from the web at the peeling edge as the web moves along the flow path, the configuration of the flow path to peel the peel-off labels from the web at the peeling edge comprising a cam disposed along the flow path immediate prior to the peeling edge as the web moves along the flow path from the label supply location, the cam being movable with respect to the peeling edge, the cam being configured to bear on the web immediately prior to the peeling edge as the web moves along the flow path, the configuration of the flow path to peel the peel-off labels from the web at the peeling edge further comprising a change in a flow path direction at the peeling edge, the cam defining the change in the flow path direction at the peeling edge when the cam bears upon the web immediately prior to the peeling edge as the web moves along the flow path, the change in the flow path direction at the peeling edge as the web moves across the peeling edge being user selectable by a movement of the movable cam;

c. placing the roll or stack of peel-off labels in the label feeding location;

d. selecting the change in the flow path direction at the peeling edge by moving the cam with respect to the peeling edge so that the peel-off labels will separate from the web at the peeling edge when the web moves along the flow path from the label supply location;

e. separating the peel-off labels from the web at the peeling edge by moving the web from the label supply location along the flow path and across the peeling edge.

16. The method of claim 15 wherein the cam in combination with the peeling edge defining a peeling edge flow path thickness across the width of the web immediately prior to the peeling edge as the web moves along the flow path, the peeling edge flow path thickness being a distance between the peeling edge and a location on the cam at which the cam bears upon the web as the web moves along the flow path, the peeling edge flow path thickness being user-selectable by the movement of the cam.

17. The method of claim 16 wherein the cam has a curved surface and wherein the configuration of the cam to bear upon the web immediately prior to the peeling edge being that the curved surface bears upon the web and is movable with respect to the peeling edge.

18. The method of claim 17 wherein the cam is a cylinder, a semicylinder, or a section of the cylinder.

19. The method of claim 17 wherein the label dispenser includes a lip, the lip being non-planar, the lip supporting the peeling edge at a lip first end, the lip extending from the peeling edge along the flow path toward the label supply location, the lip has a lip second end opposite the peeling edge, the lip in combination with the movable cam defining a lip flow path thickness, the lip flow path thickness at the lip second end is greater than the peeling edge flow path thickness immediately prior to the peeling edge when the movable cam bears upon the web.

20. The method of claim 19 wherein the lip defines the peeling edge.

* * * * *